United States Patent
Gim et al.

(10) Patent No.: US 10,261,897 B2
(45) Date of Patent: Apr. 16, 2019

(54) TAIL LATENCY AWARE FOREGROUND GARBAGE COLLECTION ALGORITHM

(71) Applicant: Samsung Electronics Co., Ltd., Suwon-si, Gyeonggi-do (KR)

(72) Inventors: Jongmin Gim, Milpitas, CA (US); Hongzhong Zheng, Sunnyvale, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/461,467

(22) Filed: Mar. 16, 2017

(65) Prior Publication Data

US 2018/0210825 A1     Jul. 26, 2018

Related U.S. Application Data

(60) Provisional application No. 62/448,957, filed on Jan. 20, 2017.

(51) Int. Cl.
    *G06F 12/02*     (2006.01)

(52) U.S. Cl.
    CPC .. *G06F 12/0246* (2013.01); *G06F 2212/1024* (2013.01); *G06F 2212/1044* (2013.01); *G06F 2212/2022* (2013.01); *G06F 2212/7201* (2013.01); *G06F 2212/7205* (2013.01)

(58) Field of Classification Search
    CPC .................................................. G06F 12/0246
    See application file for complete search history.

(56) References Cited

U.S. PATENT DOCUMENTS

| | | | |
|---|---|---|---|
| 5,652,857 A | 7/1997 | Shimoi et al. | |
| 5,815,434 A | 9/1998 | Hasbun et al. | |
| 5,936,884 A | 8/1999 | Hasbun et al. | |
| 9,223,716 B2 | 12/2015 | Wang et al. | |
| 2007/0094445 A1 | 4/2007 | Trika et al. | |
| 2011/0055455 A1* | 3/2011 | Post | G06F 12/0246 711/103 |
| 2015/0026390 A1* | 1/2015 | Li | G06F 12/0246 711/103 |
| 2015/0301748 A1 | 10/2015 | Lee | |

(Continued)

FOREIGN PATENT DOCUMENTS

| | | |
|---|---|---|
| CN | 1114214 | 7/2003 |
| JP | 2011128826 A | 6/2011 |

(Continued)

*Primary Examiner* — Ryan Bertram
*Assistant Examiner* — Trang K Ta
(74) *Attorney, Agent, or Firm* — Renaissance IP Law Group LLP

(57) ABSTRACT

A Solid State Drive (SSD) is disclosed. The SSD may include a host interface logic to receive a write command from a host and flash memory to store data. The SSD may also include an SSD controller, which may include storage for a just-in-time threshold and a tail latency threshold flash translation layer. The flash translation layer may invoke a just-in-time garbage collection strategy when the number of free pages on the SSD is less than the just-in-time threshold, and a tail latency-aware garbage collection strategy when the number of free pages is less than the tail latency threshold. The tail latency-aware garbage collection strategy may pair the write command with a garbage collection command.

17 Claims, 12 Drawing Sheets

(56) References Cited

U.S. PATENT DOCUMENTS

| | | | |
|---|---|---|---|
| 2016/0004474 A1 | 1/2016 | Li | |
| 2016/0070593 A1* | 3/2016 | Harris | G06F 9/4843 718/106 |
| 2016/0267011 A1 | 9/2016 | Chang et al. | |
| 2016/0285771 A1 | 9/2016 | Kulkarni | |
| 2018/0039425 A1* | 2/2018 | Li | G06F 3/0611 |

FOREIGN PATENT DOCUMENTS

| | | | |
|---|---|---|---|
| KR | 100319017 B1 | 4/2002 |
| KR | 100970537 B1 | 7/2010 |

\* cited by examiner

TAIL LATENCY AWARE FOREGROUND GARBAGE COLLECTION ALGORITHM

RELATED APPLICATION DATA

This application claims the benefit of U.S. Provisional Patent Application Ser. No. 62/448,957, filed Jan. 20, 2017, which is incorporated by reference herein for all purposes.

This application is related to U.S. patent application Ser. No. 14/732,654, filed Jun. 5, 2015, now pending, which claims the benefit of U.S. Provisional Patent Application Ser. No. 62/130,597, filed Mar. 9, 2015, both of which are incorporated by reference herein for all purposes.

This application is related to U.S. patent application Ser. No. 15/133,205, filed Apr. 19, 2016, now pending, which claims the benefit of U.S. Provisional Patent Application Ser. No. 62/286,926, filed Jan. 25, 2016, both of which are incorporated by reference herein for all purposes.

FIELD

The inventive concepts relate generally to solid state drives (SSDs), and more particularly to improving tail latency for SSDs.

BACKGROUND

Although an ideal computer system would take the same amount of time to process any individual query, the real world is seldom that perfect. When plotted as a graph comparing number of queries vs. latency—that is, the time required to complete the query, the graph would show some queries answered in a relatively short amount of time, whereas other queries take a relatively long amount of time. These data points that are at the far end of the graph will likely exist regardless of the shape of the graph. As the number of queries that take relatively long amounts of time are on the far end of the graph and typically tail off toward zero, the time required to answer these queries with a high latency are often termed "tail latency".

There are any number of reasons why computer systems may experience tail latency. For example, if needed data is typically cached in a high speed cache but some data is stored in a (relatively) slow longer term storage (such as a hard disk drive), queries that require the data stored in the longer term storage frequently will be slower than requests for data stored in the high speed cache. Another reason for tail latency may be writing data to longer term storage. Writing data may take longer than just reading data: for example, even if only one byte is being changed in the data, when writing data to a Solid State Drive (SSD) an entire block must be written. Background operations may also delay the time required to complete a query. For example, SSDs perform garbage collection operations to identify blocks that may be erased (and which might require some data to be programmed to other blocks). If a garbage collection operation is underway when a query arrives, the query may have to wait for the garbage collection operation to complete before the query may be satisfied. This delay due to garbage collection may affect the tail latency of queries.

Like other statistics, tail latency may be measured as a percentage of the overall performance. For example, the term "5% tail latency" may refer to the 5% of queries that have the largest overall latency, whereas "1% latency" may refer to the 1% of queries that have the largest overall latency.

In modern computer database systems, the 1% tail latency of the system is a critical issue. 1% tail latency may decide service quality in the worst case. Modern databases, such as BigTable, HBase, LevelDB, MongoDB, SQLite4, RocksDB, Wired Tiger, and Cassandra, use log structured merge (LSM) trees in order to manage data. LSM trees may have poor 1% tail latency even though they show a good performance in general. The response time from the database cache may be excellent, but the response time from a SSD may be bad due to the large size of data to be written to the SSD, and the response time from storage with garbage collection may produce the worst performance, regardless of TRIM support. Garbage collection is a major source for the 1% tail latency: SSDs may not avoid performing garbage collection. In addition, when databases use LSM trees, sometimes a large database flush may occur and trigger 1% tail latency, especially when this database flush operation works concurrently with garbage collection.

A need remains for a way for to improve the tail latency of SSDs.

DETAILED DESCRIPTION

Figure 1:
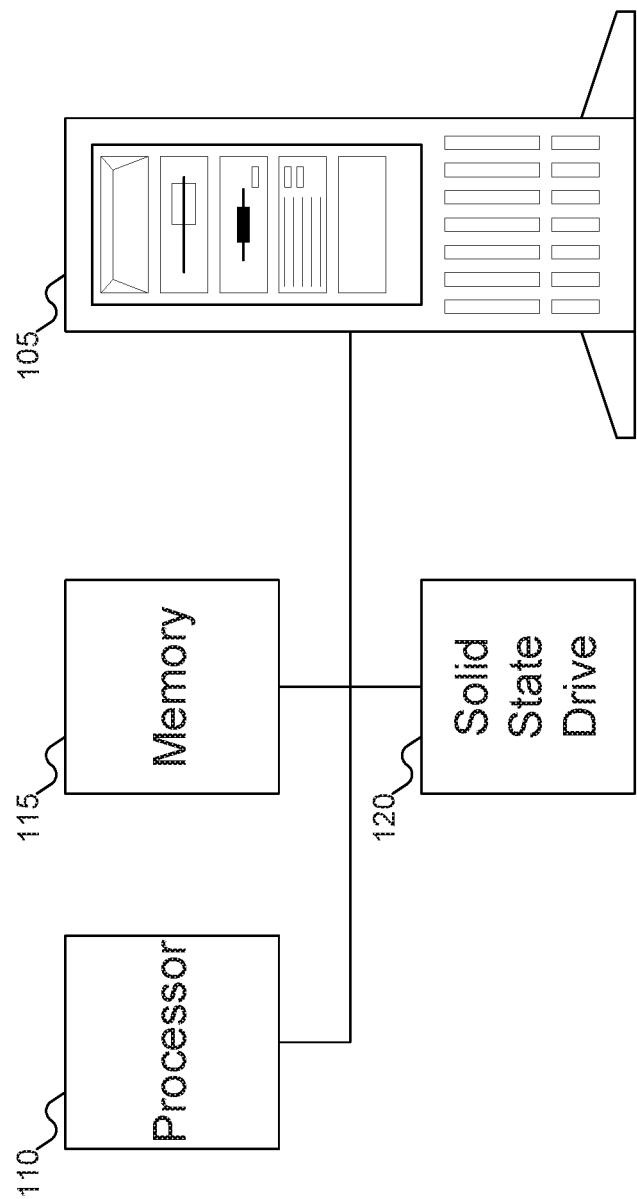
FIG. 1 shows a machine with a Solid State Drive (SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Modern databases like BigTable, HBase, LevelDB, MongoDB, SQLite4, RocksDB, Wired Tiger, and Cassandra often use a log structured merge (LSM) tree in order to manage data. LSM trees are very efficient at reducing the total number of actual input/output (I/O) between a database cache and a storage device. Such database applications do gets/puts with small I/O requests, but most I/O requests are performed by database caches. When a database needs to store data into back-end storage, it transforms the dataset based on a static sorted table (SST). For example, RocksDB supports 6 levels of SST, and each level of SST has an associated size. Most I/O requests from applications hit on the DB cache so that the database application has a pretty fast response time.

On the other hand, the database application has a weak point: terrible 1% tail latency, caused by the large size of an SST write and associated compaction overhead. Image the worst scenario which may happen in an LSM tree based database. Assume an application writes (8-bytes) somewhere. Unfortunately the 8-byte write requires an SST update and the update requires a 1 GB SST6 replacement. Further assume that the Solid State Drive (SSD)—or other storage devices that require garbage collection, such as shingled storage HDDs—has insufficient free pages (including overprovisioning) to store the data. Therefore, foreground garbage collection (FGC) is triggered, and the SSD firmware starts to perform garbage collection on 1 GB worth of blocks. After the garbage collection operation is completed, the application may then write the SST to SSD. Thus, in order to write 8 bytes of data, 1 GB of data would be moved to storage, including an extremely slow garbage collection process.

The problem of tail latency may be addressed by maintaining additional threshold points to trigger garbage collection in enterprise SSDs. If FGC is triggered, write operations should be done after cleaning blocks. As the size of requests goes up, the more total number of blocks to be cleaned also goes up. By increasing 5% tail latency, the impact of 1% tail latency may be reduced, creating a balanced FGC scheme. With this scheme, a database service provider may support more stable response times than legacy SSDs. FGC may be triggered earlier than legacy FGC by an additional threshold point, the number of blocks to be cleaned up during this FGC may vary according to a mapping table, rather than being the same as a write request size, and the algorithm may provide balanced input/output (I/O) latency on FGC.

The key overhead for writing is erasing time. The time required to erase 1 block is much greater than the time required to write 1 block. An objective may be to adjust latencies to be fair when FGC is triggered. By adding a second threshold to trigger FGC and by building a table to decide how many blocks should be erased for a given write, the average latency should be similar for every write size. Such a scheme is especially useful in conjunction with LSM trees, as LSM trees involve a small numbers of I/O sizes, but this scheme may be used in conjunction with database structures or other applications with unlimited write sizes.

As an example, assume that the time required to perform a 128 MB write command may be expressed as "$\alpha$ blocks Erase"+"$\beta$ MB Write". Depending on the time required to perform erase operations on a particular SSD, this 128 MB write latency might, for example, be similar to the time for a 66 MB write command and 33 MB erase command, a 6 MB write command and 66 MB erase command, and a 1 MB write command and 99 MB erase command. A decision table, as shown in Table 1, may be built.

TABLE 1

| Write Size | Erase Size |
|---|---|
| 128 MB | 0 MB |
| 66 MB | 33 MB |
| 6 MB | 66 MB |
| 1 MB | 99 MB |
| . . . | . . . |

Now, when a write command is received by the SSD, the decision table may be consulted. If the write command is to write more than 128 MB of data, then no blocks are erased. If the write command is to write more than 66 MB of data (but less than 128 MB), then 33 MB of data may be erased. If the write command is to write more than 6 MB of data (but less than 66 MB), then 66 MB of data may be erased. And so on.

By pairing write commands with garbage collection commands, the overall latency for the pair is approximately that required to perform a 128 MB write command. By distributing erase operations across multiple write commands, the likelihood of a worst case FGC event is reduced, improving overall performance. Note that while this example attempts to guarantee a write latency equivalent to writing 128 MB of data, other target latencies may be used.

FIG. 1 shows a machine with a Solid State Drive (SSD), according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired application: database applications are a good example, but embodiments of the inventive concept may extend to any desired application.

Machine 105, regardless of its specific form, may include processor 110, memory 115, and Solid State Drive (SSD) 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically DRAM. Memory 115 may also be any desired combination of different memory types.

SSD 120 may be any variety of SSD, and may even be extended to include other types of storage that perform garbage collection (even when not using flash memory).

Figure 2:
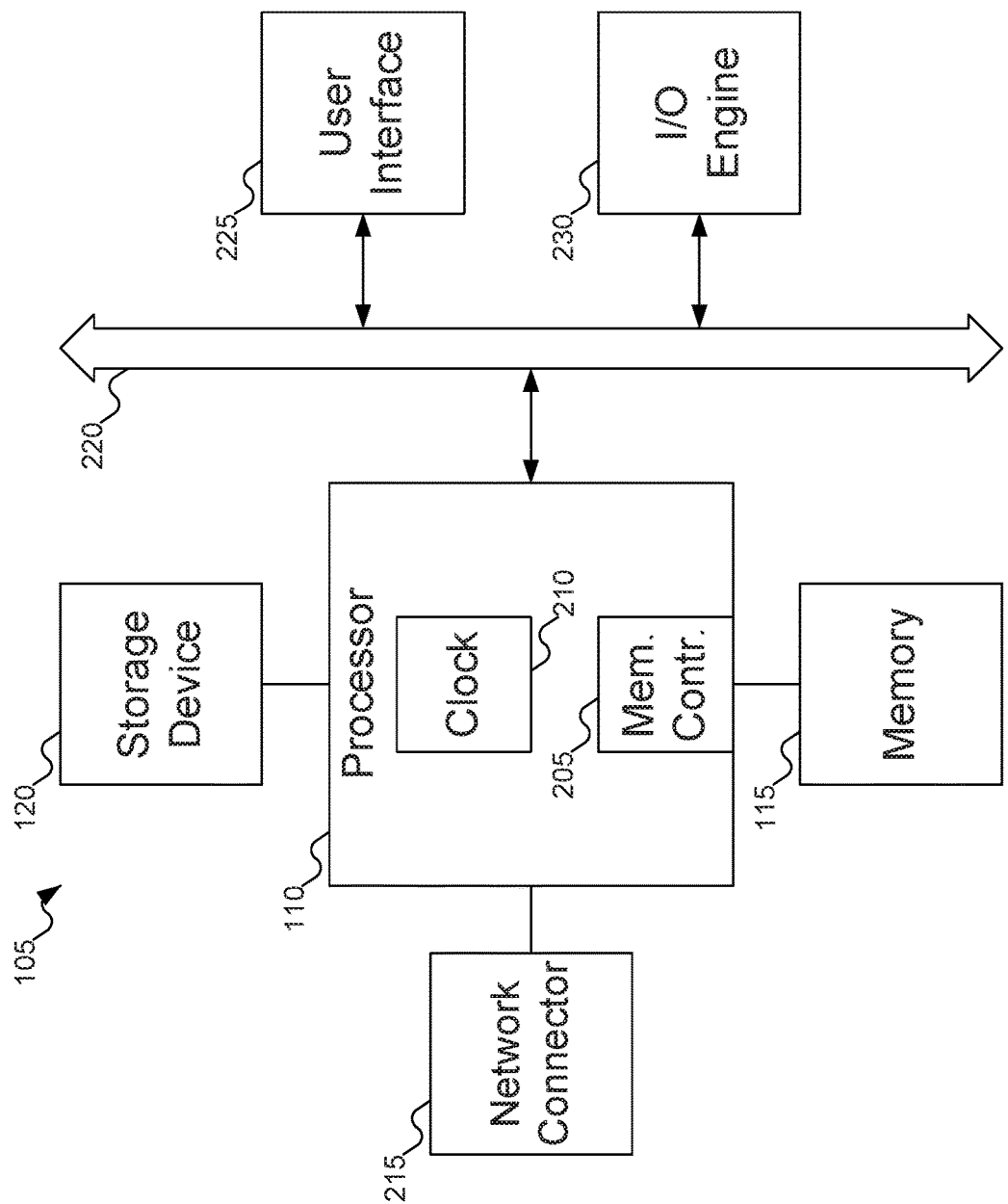
FIG. 2 shows additional details of the machine of FIG. 1.

FIG. 2 shows additional details of the machine of FIG. 1. Referring to FIG. 2, typically, machine 105 includes one or more processors 110, which may include memory controller 205 and clock 210, which may be used to coordinate the operations of the components of machine 105. Processors 110 may also be coupled to memory 115, which may include random access memory (RAM), read-only memory (ROM), or other state preserving media, as examples. Processors 110 may also be coupled to storage devices 120, and to network connector 215, which may be, for example, an Ethernet connector or a wireless connector. Processors 110 may also be connected to a bus 220, to which may be attached user interface 225 and Input/Output interface ports that may be managed using Input/Output engine 230, among other components.

Figure 3:
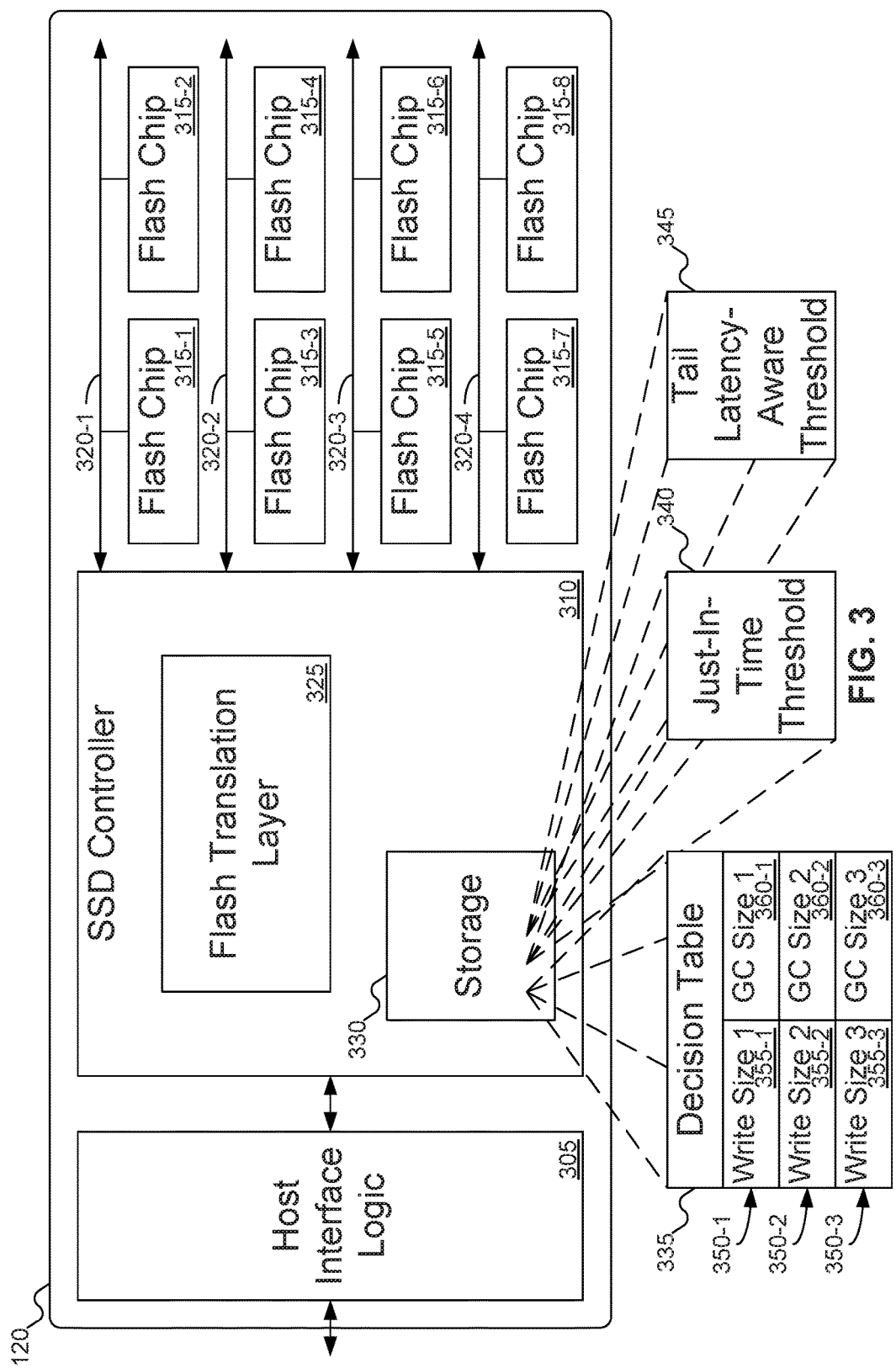
FIG. 3 shows details of the SSD of FIG. 1.

FIG. 3 shows details of SSD 120 of FIG. 1. In FIG. 3, SSD 120 may include host interface logic 305, SSD controller 310, and various flash memory chips 315-1 through 315-8, which may be organized into various channels 320-1 through 320-4. Host interface logic 305 may manage communications between SSD 120 and machine 105 of FIG. 1. SSD controller 310 may manage the read and write operations, along with garbage collection operations, on flash memory chips 315-1 through 315-8. SSD controller 310 may include flash translation layer 325 to perform some of this management. Flash translation layer 325 is shown in greater detail in FIG. 5 below.

SSD controller 310 may also include storage 330. Storage 330 may store decision table 335, just-in-time threshold 340, and tail latency-aware threshold 345. As described below with reference to FIG. 5, just-in-time threshold 340 and tail latency-aware threshold 345 represent thresholds to be used to trigger the just-in-time garbage collection strategy and the tail latency-aware garbage collection strategy, respectively. Just-in-time threshold 340 and tail latency-aware threshold 345 may be given any desired values: for example, 1% and 5%, respectively, of the total number of pages offered by SSD 120 of FIG. 1 (either considering or ignoring overprovisioning) remains free. Typically, just-in-time threshold 340 is lower than tail latency-aware threshold 345: that is, the tail latency-aware garbage collection strategy may be invoked before just-in-time garbage collection strategy.

Decision table 345 may store pairs 350-1 through 350-3 of write command sizes 355-1 through 355-3 and garbage collection command sizes 360-1 through 360-3. The overall time (or latency) required for each pair 350-1 through 350-3 of command sizes is approximately the same. That is, the time required to perform the write command and the garbage collection command of the indicated sizes in each pair 350-1 through 350-3 is approximately the same.

While FIG. 3 shows pairs 350-1 through 350-3 pairing write command sizes 355-1 through 355-3 with garbage collection command sizes 360-1 through 360-3, most of the time required to perform garbage collection is spent in erasing the blocks: the time required to program valid data that remains in the target blocks into other pages is variable and (relatively) minimal. Thus, rather than pairing write command sizes 355-1 through 355-3 with garbage collection command sizes 360-1 through 360-3, decision table 335 may pair write commands 355-1 through 355-3 with erase command sizes. Any reference to a "garbage collection command" is therefore intended to cover just erase commands as well.

While an ideal world would have each pair 350-1 through 350-3 take exactly the same amount of time, the real world is rarely that precise, and it is sufficient if each pair 350-1 through 350-3 is within some delta of a target latency: that is, each pair 350-1 through 350-3 takes approximately the target latency. In addition, while FIG. 3 shows decision table 335 as including three pairs 350-1 through 350-3, embodiments of the inventive concept may support any number of pairs in decision table 335. Finally, although FIG. 3 shows storage 330 as part of SSD controller 310, storage 330 may just as easily be part of flash translation layer 325.

While FIG. 3 shows SSD 120 as including eight flash memory chips 315-1 through 315-8 organized into four channels 320-1 through 320-4, embodiments of the inventive concept may support any number of flash memory chips organized into any number of channels.

Figures 4, 5:
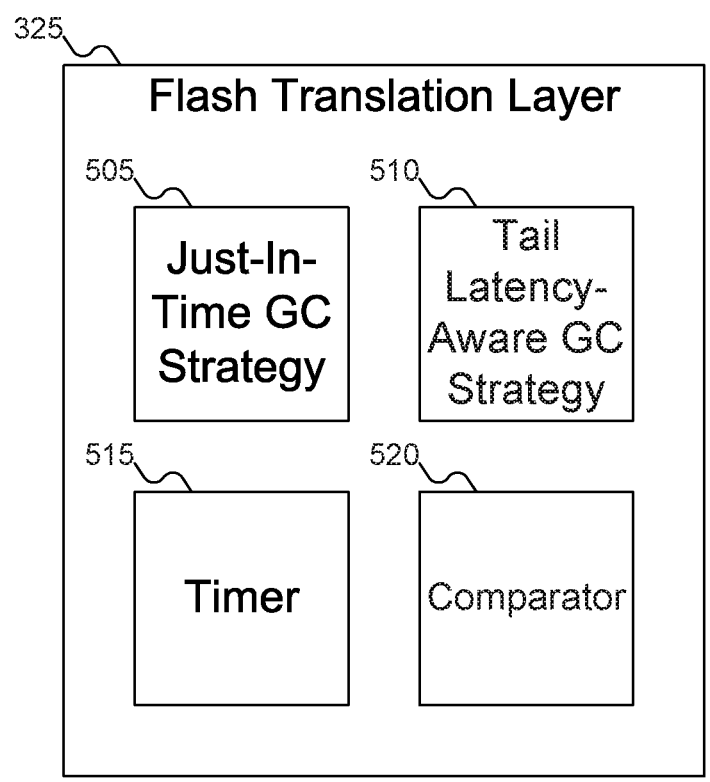
FIG. 4 shows the decision table of FIG. 3 using alternative data, according to another embodiment of the inventive concept.
FIG. 5 shows details of the flash translation layer of FIG. 3.

While decision table 335 is shown as using the size of write commands and garbage collection commands, embodiments of the inventive concept may support other ways to estimate how many blocks on which to perform garbage collection. FIG. 4 shows decision table 335 of FIG. 3 using alternative data, according to another embodiment of the inventive concept. In FIG. 4, instead of storing write sizes, decision table 335 shows pairs 405-1 through 405-3, with each pair including write counts 410-1 through 410-3 and garbage collection counts 415-1 through 415-3. Write counts 410-1 through 410-3 specify a number of write commands to be performed to complete a particular requested command. For example, as described below with reference to FIG. 5, the operating system may limit the amount of data to be written in a single write command to avoid the system waiting too long for input/output (I/O) commands to complete. Thus, a single write request from an application might result in any number of write commands being sent to SSD 120 of FIG. 1.

While an exact formula correlating the number of write commands or the number of garbage collection to an amount of time required to perform the commands might not exist, generally the more commands are to be performed, the longer the amount of time needed to perform those commands. Thus, it is possible to generally correlate the number of commands—either write commands or garbage collection commands—with the time required to perform those commands.

For example, knowing that a write command (as received from the operating system or the file system) is no larger than some maximum size (e.g., 128 MB) and that the latency for a particular write command is no greater than some maximum latency (e.g., 10 ms), an upper bound on the time required to complete a given number of write commands may be calculated as the product of the number of write commands and the maximum latency for any individual write command. This estimate of the time required to complete the number of write commands may be overly conservative, but this estimate is not unreasonable (an overly conservative estimate only means that SSD 120 of FIG. 1 might complete the write commands faster than estimated).

Similarly, garbage collection counts 415-1 through 415-3 may be correlated with time. That is, the time required to perform garbage collection on a specific number of blocks is roughly linear in the number of blocks being erased. Garbage collection may also involve programming some valid data from the blocks that were targeted for garbage collection: how long programming takes would depend on the amount of data to be programmed. But the time required to program valid data from a block targeted for garbage collection is small relative to the time required to erase the block.

While FIGS. 3 and 4 show decision table 335 using either command sizes or numbers of commands, it is also possible to mix these options in decision table 335, in any desired manner. For example, decision table 335 might include a pair that includes a write command size and a number of garbage collection commands. For purposes of this discussion, the term "command information" is defined to mean either a number of commands or a size of a command to be performed as these terms are used above, and can be applied to either write commands or garbage collection. Embodiments of the inventive concept are intended to cover all possible such variations on decision table 335.

FIG. 5 shows details of flash translation layer 325 of FIG. 3. In FIG. 5, flash translation layer 325 may include just-in-time garbage collection strategy 505, tail latency-aware garbage collection strategy 510, timer 515, and comparator 520. Just-in-time garbage collection strategy 505 may specify how foreground garbage collection is performed when the number of free pages on SSD 120 of FIG. 1 reaches a critical level, represented by just-in-time threshold 340. Just-in-time threshold 340 may be given any desired value: for example, 1% of the total number of pages offered by SSD 120 of FIG. 1 (either considering or ignoring overprovisioning) remains free. Tail latency-aware garbage collection strategy 510 may specify how foreground garbage collection is performed when the number of free pages on SSD 120 of FIG. 1 drops to a lower level, represented by tail-latency-aware threshold 345, which is not as low as just-in-time threshold 340. Tail latency-aware threshold 345 may be given any desired value: for example, 5% of the total number of pages offered by SSD 120 of FIG. 1 (either considering or ignoring overprovisioning) remains free. Ideally, the selected value for tail latency-aware threshold 345 is high enough that just-in-time garbage collection strategy 505 is not needed at all, although lower values for tail latency-aware threshold 345 may be selected. The logic that selects and implements just-in-time garbage collection strategy 505 and tail latency-aware garbage collection strategy 510 may be implemented in firmware within flash translation layer 325.

Figure 7:
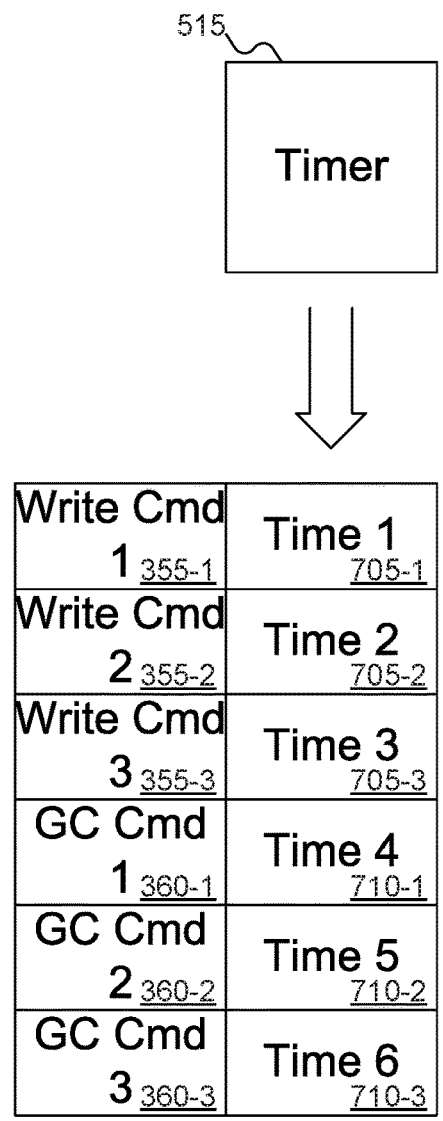
FIG. 7 shows the timer of FIG. 5 determining the times required for various write and garbage collection operations, for use in the decision table of FIG. 5.

Timer 515 may be used to measure how long it takes SSD 120 of FIG. 1 to complete write and garbage collection operations, as described with reference to FIGS. 7-8 below. The results of timer 515 may be used to populate decision table 335.

Finally, comparator 520 may be used to determine whether a particular garbage collection strategy should be invoked. For example, comparator 520 may compare thresholds 340 and 345 with the number of free pages on SSD 120 of FIG. 1, and use the result of this comparison to determine which garbage collection strategy 505 or 510 (if either) should be invoked. Comparator 520 is discussed further with reference to FIGS. 6A-6B below.

Figure 6A:
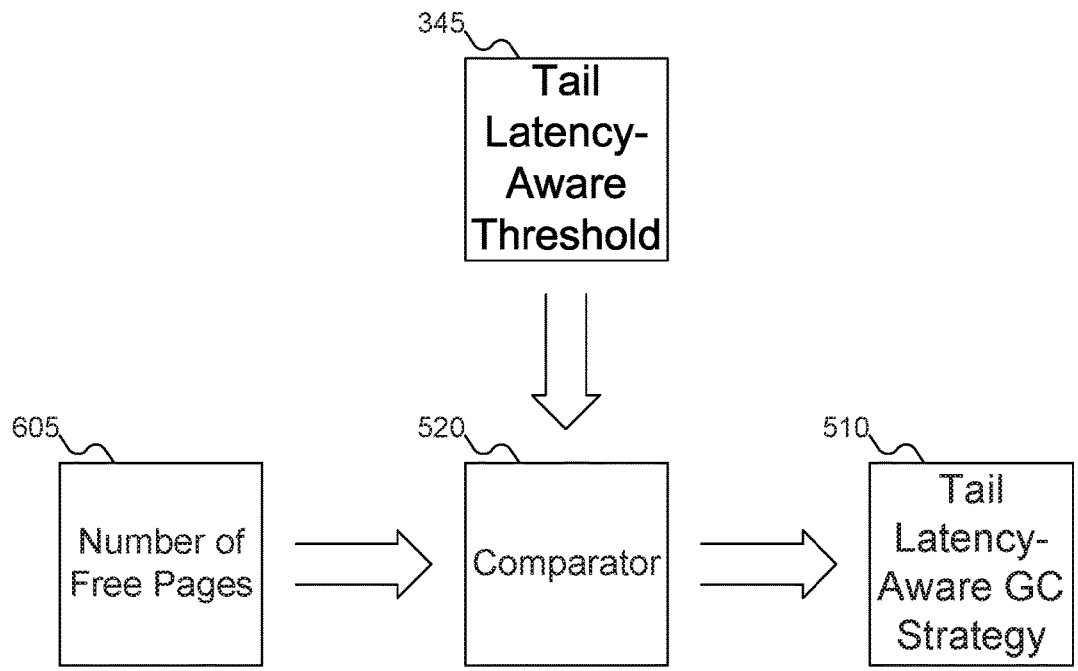
FIGS. 6A-6B shows the comparator of FIG. 5 determining whether to invoke either the just-in-time garbage collection strategy or the tail latency-aware garbage collection strategy of FIG. 5.
Figure 6B:
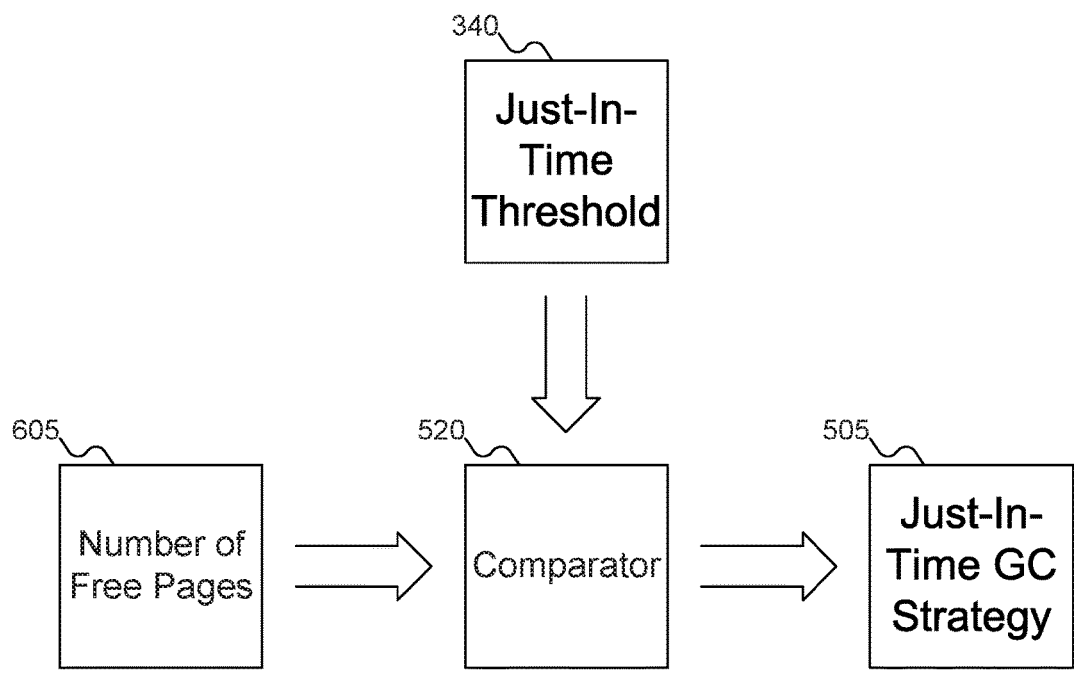

FIGS. 6A-6B shows comparator 520 of FIG. 5 determining whether to invoke either just-in-time garbage collection strategy 505 or tail latency-aware garbage collection strategy 510 of FIG. 5. In FIG. 6A, comparator 520 is shown comparing number of free pages 605 with tail latency-aware threshold 345: number of free pages 605 may be the number of free pages currently available on SSD 120 of FIG. 1. If number of free pages 605 is less than (alternatively, less than or equal to) tail latency-aware threshold 345, then tail latency-aware garbage collection strategy 510 may be invoked. Since tail latency-aware garbage collection strategy 510 may involve performing some garbage collection operations even though they are not needed to perform the current write command, these garbage collection commands may avoid SSD 120 of FIG. 1 encountering a 1% tail latency situation.

In FIG. 6B, comparator 520 is shown comparing number of free pages 605 with just-in-time threshold 340. If number of free pages 605 is less than (alternatively, less than or equal to) just-in-time threshold 340, then just-in-time garbage collection strategy 505 may be invoked.

Note that, because tail latency-aware garbage collection strategy 510, when used, may avoid the 1% tail latency problem, tail latency-aware garbage collection strategy 510 should be invoked before just-in-time garbage collection strategy 505. Thus, tail latency-aware threshold 345 should be a higher number than just-in-time threshold 340.

One question that has not yet been addressed is how decision table 335 of FIG. 3 is established. While it would be nice if there were a simple equation that could be used to determine how long a particular write or garbage collection command would take, such is not always possible. For example, the time required to write two adjacent blocks is approximately 50% greater than the time required to write one block. Nor is the time required to erase blocks necessarily expressible as a function of the number of blocks to be erased. (Of course, if a particular model of SSD permits such simple equations to be used, then determining the number of blocks to erase to pair with a given write command becomes a simple process. But in general, it might not be possible to determine any such equation.)

Thus, decision table 335 of FIG. 3 needs to be populated in some manner that does not depend on there being equations that may be used. To populate decision table 335 of FIG. 3, timer 515 of FIG. 5 may be used, as shown in FIG. 7. At the startup time of SSD 120 of FIG. 1, SSD 120 of FIG. 1 may perform write commands of various sizes (either on its own, or monitoring real traffic), such as write command sizes 355-1 through 355-3, and garbage collection commands on various numbers of blocks, such as garbage collection command sizes 360-1 through 360-3. Timer 515 may then time how long each of these commands takes, producing times 605-1 through 605-3 (the times required for write commands 355-1 through 355-3) and times 610-1 through 610-3 (the times required for garbage collection commands 360-1 through 360-3). Then, as shown in FIG. 8, target latency 805 may be determined, and write command sizes 355-1 through 355-3 may be paired with garbage collection command sizes 360-1 through 360-3 so that each pair takes approximately target latency 805 (to within some delta).

Of course, the question itself raises another question: how is target latency 805 determined? Target latency 805 (and tail latency-aware threshold 335 of FIG. 3) may be fixed in advance to any desired values. For example, tail latency-aware threshold 335 of FIG. 3 may be set to 5% of the number of pages on SSD 120 of FIG. 1 to which data may be written, and target latency 805 may be set to the latency of a 128 MB write command (whatever that length of time happens to be for SSD 120 of FIG. 1). Another option would be to allow the customer (e.g., an admin user of the server in question) to configure the values for target latency 805 and tail latency-aware threshold 335 of FIG. 3. (Indeed, even if the original values for target latency 805 and tail latency-aware threshold 335 of FIG. 3 are selected using some automatic or semi-automatic technique, use of SSD 120 of FIG. 1 might indicate that SSD 120 of FIG. 1 might benefit from adjustment of these values: giving the administrative user some method for modifying these values would therefore be beneficial.)

But in practice, both the application supported by SSD 120 of FIG. 1 and the workload of SSD 120 of FIG. 1 may affect the performance of SSD 120 of FIG. 1, and therefore when and how often SSD 120 of FIG. 1 encounters a 1% tail latency situation. For example, large scale database systems often include servers performing various different functions: background servers, foreground servers, load servers, data servers, etc. Typically, each of these servers has a different workload. If all the SSDs in these servers were configured to use the same target latencies and thresholds, the overall system operation might be suboptimal. A superior configuration would have each SSD configured with different target latencies and different thresholds, as appropriate to the workloads of the SSDs. Therefore, knowing the expected workload of the SSD may impact the (at least default) choices for target latency 805 and tail latency-aware threshold 335 of FIG. 3.

There are several ways in which the workload of SSD 120 of FIG. 1 may be determined. For example, when the customer installs SSD 120 of FIG. 1, SSD 120 of FIG. 1 may prompt the customer to select an expected workload for SSD 120 of FIG. 1 from a list (or at least the closest such match). Based on the customer's selected workload, SSD 120 of FIG. 1 may access appropriate default values for target latency 805 and tail latency-aware threshold 335 of FIG. 3 from somewhere within SSD 120 of FIG. 1 (for example, from storage 330 of 330). These default values for the different workloads may be determined and stored in SSD 120 of FIG. 1 in any desired manner. For example, the operations of other SSDs with similar workloads may be analyzed to determine the average target latencies of those SSDs and the average tail latency-aware thresholds used: this average may then be used as the default values for future SSDs (possibly subject to updating based on newer data). This concept may even be extended to the default values for decision table 335 of FIG. 3: the average times required to perform write commands and garbage collection commands of various sizes may be determined and used to pair write commands and garbage collection commands to achieve a desired target latency. (The drawback to using average write and garbage collection times to assign default pairs to decision table 335 of FIG. 3 is that the average write and garbage collection times do not necessarily represent the times requires for writing and garbage collection on SSD 120 of FIG. 1.)

Another approach has the customer provide information about the workload to be imposed on SSD 120 of FIG. 1 to the SSD (or the SSD vendor). The SSD/vendor may then either pre-populate decision table 335 of FIG. 3 or provide a script that may automate the population of decision table 335 of FIG. 3 when SSD 120 of FIG. 1 is first powered up.

For decision table 335 of FIG. 3 to be useful, decision table 335 of FIG. 3 needs to include enough write and garbage collection command size pairs so that for a write command of any given size, the pair in decision table 335 of FIG. 3 that covers that write command will produce a total latency that is approximately target latency 805. In one embodiment of the inventive concept, write commands may be grouped into ranges of sizes, where a write command that includes any size in the range is considered to be covered by that pair. For example, in Table 1 above, commands are grouped into size ranges covering 0-1 MB, 1-6 MB, 6-66 MB, and 66-128 MB.

For systems where write commands are sent in a relatively small number of discrete sizes, using ranges of write sizes to organize decision table 335 of FIG. 3 works well. For example, log structured merge (LSM) trees write data to SSD 120 of FIG. 1 in data chunks governed by the Static Sorted Table (SST), which writes data to SSD 120 of FIG. 1 using a limited number of write sizes. But if write commands of different sizes are grouped together this way, the system may not use tail latency-aware garbage collection to its best result. For example, in Table 1 above, commands to write 6 MB of data are paired with the same garbage collection command as commands to write 66 MB. Thus, in another embodiment of the inventive concept, decision table 335 of FIG. 3 may include pairs for many discrete write sizes.

If too many different write sizes were used, the expectation might be that too many pairs would need to be included in decision table 335 of FIG. 3. But from a practical point of view, the operating system may limit the amount of data written in a single write command. For example, in machines including a southbridge chip (which is responsible for I/O commands) I/O commands may not be interrupted. If write commands of excessive size were sent to SSD 120 of FIG. 1, machine 105 of FIG. 1 might find itself unreasonably delayed waiting for the write command to complete. Therefore, many operating systems, such as the Linux kernel, may limit write commands to a maximum size, such as 128 MB. If more than 128 MB of data needs to be written, the operating system may break the data into chunks that are no greater than 128 MB, ensuring that the longest time for which machine 105 of FIG. 1 is busy performing I/O is the amount of time needed to perform a 128 MB write command. If decision table 335 of FIG. 3 includes 128 entries, there would be enough room to support a different pair for each possible write size, as measured in MB. (Of course, if the same number of blocks would be erased for multiple different write sizes, then those write sizes may be grouped into a range anyway.)

Figure 9A:
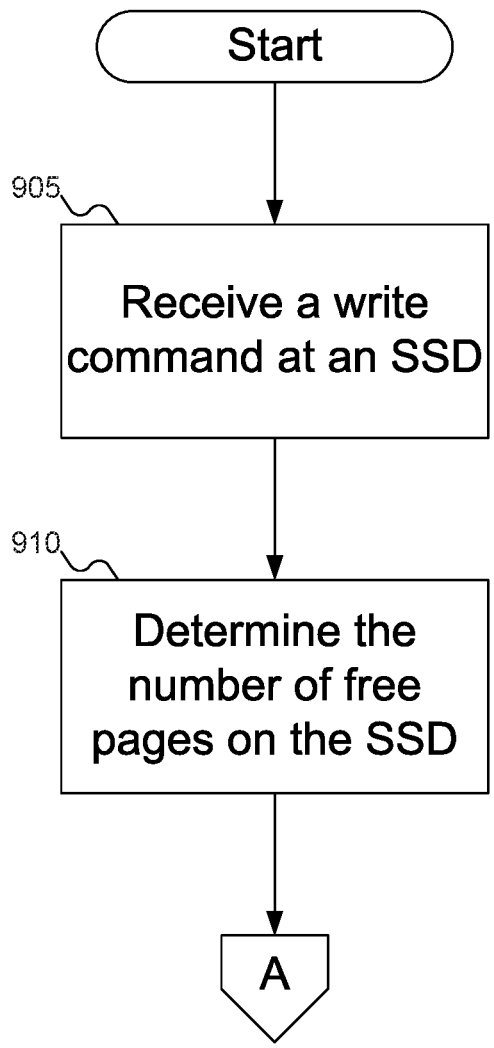
FIGS. 9A-9B show a flowchart of an example procedure for the flash translation layer of FIG. 3 to determine whether to perform either the just-in-time garbage collection strategy or the tail latency threshold strategy of FIG. 5 upon receiving a write command, according to an embodiment of the inventive concept.
Figure 9B:
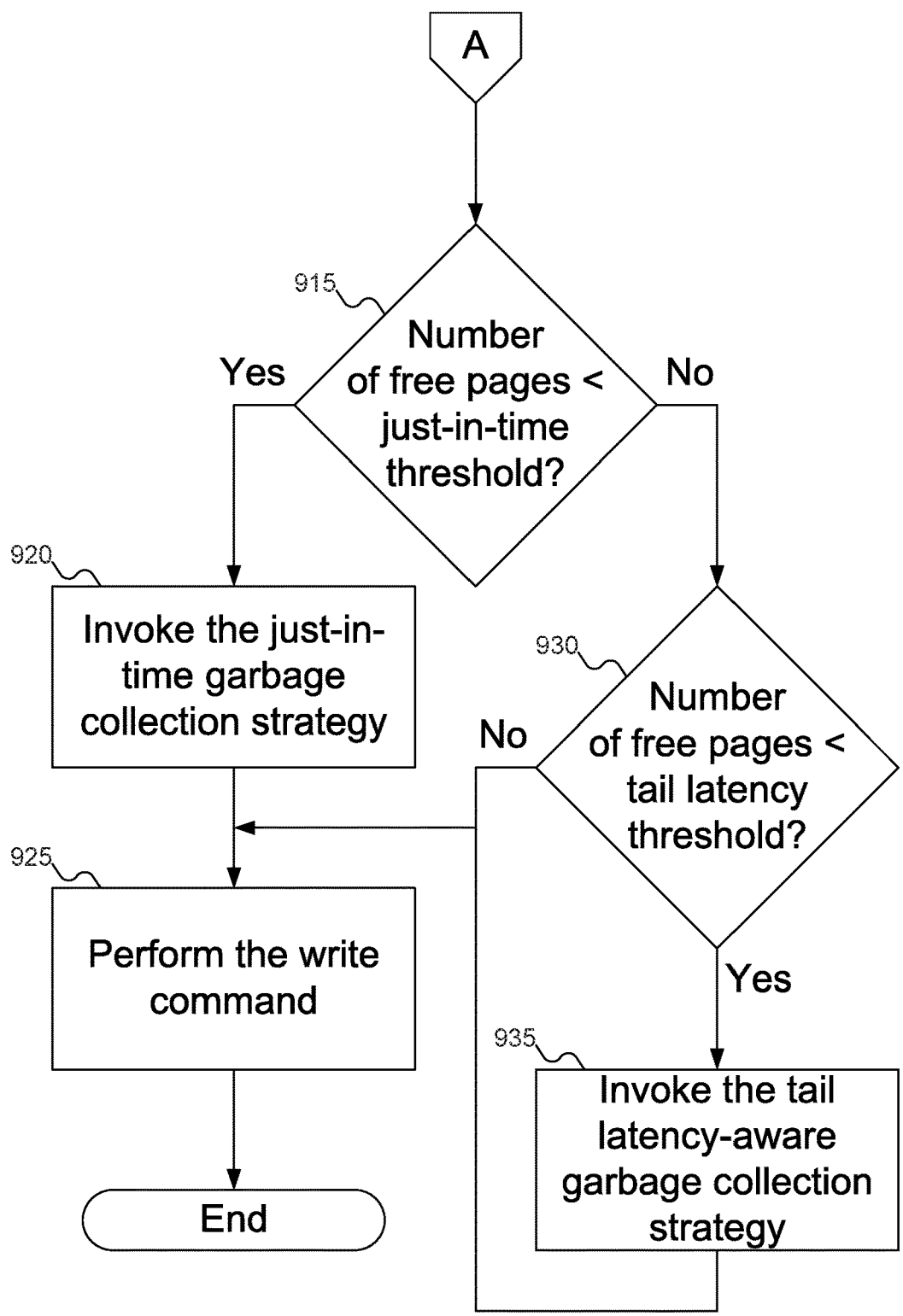

FIGS. 9A-9B show a flowchart of an example procedure for flash translation layer 325 of FIG. 3 to determine whether to perform either just-in-time garbage collection strategy 505 or tail latency threshold strategy 510 of FIG. 5 upon receiving a write command, according to an embodiment of the inventive concept. In FIG. 9A, at block 905, SSD 120 of FIG. 1 may receive a write command from machine 105. At block 910, flash translation layer 325 of FIG. 3 may determine number of free pages 605 of FIG. 6.

At block 915 (FIG. 9B), comparator 520 of FIG. 5 may compare number of free pages 605 of FIG. 6 with just-intime threshold 340 of FIG. 3. If number of free pages 605 of FIG. 6 is less then (or potentially equal to) just-in-time threshold 340 of FIG. 3, then at block 920 flash translation layer 325 of FIG. 3 may perform garbage collection using just-in-time garbage collection strategy 505 of FIG. 5, after which, at block 925, SSD 120 of FIG. 1 may perform the received write command.

If at block 915 number of free pages 605 of FIG. 6 is greater than (or potentially equal to) just-in-time threshold 340 of FIG. 3, then at block 930 comparator 520 of FIG. 5 may compare number of free pages 605 of FIG. 6 with tail latency-aware threshold 345 of FIG. 3. If number of free blocks 605 of FIG. 6 is less than (or potentially equal to) tail latency-aware threshold 345 of FIG. 3, then at block 935 flash translation layer 325 of FIG. 3 may perform garbage collection using tail latency-aware garbage collection strategy 510 of FIG. 5, after which at block 925 SSD 120 of FIG. 1 may perform the received write command.

Finally, if number of free blocks 605 of FIG. 6 exceeds both just-in-time threshold 340 and tail latency-aware threshold 345 of FIG. 3, then SSD 120 of FIG. 1 may proceed directly to perform the received write command at block 925.

Figure 10:
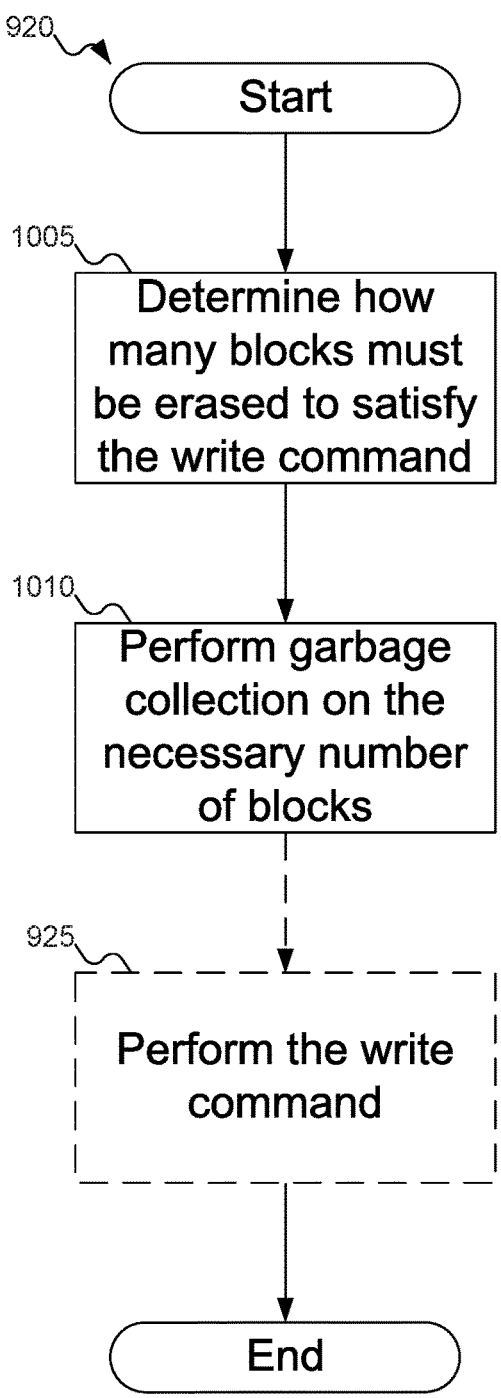
FIG. 10 shows a flowchart of an example procedure for using the just-in-time garbage collection strategy of FIG. 5, according to an embodiment of the inventive concept.

FIG. 10 shows a flowchart of an example procedure for using just-in-time garbage collection strategy 505 of FIG. 5, according to an embodiment of the inventive concept. In FIG. 10, at block 1005, flash translation layer 325 of FIG. 3 may determine how many blocks must be erased to free enough pages to perform the received write command. Then at block 1010, flash translation layer 325 of FIG. 3 may perform garbage collection on the required number of blocks, after which SSD 120 of FIG. 1 may perform the write command at block 925 (shown with dashed lines since block 925 is not technically part of performing just-in-time garbage collection).

Figure 11:
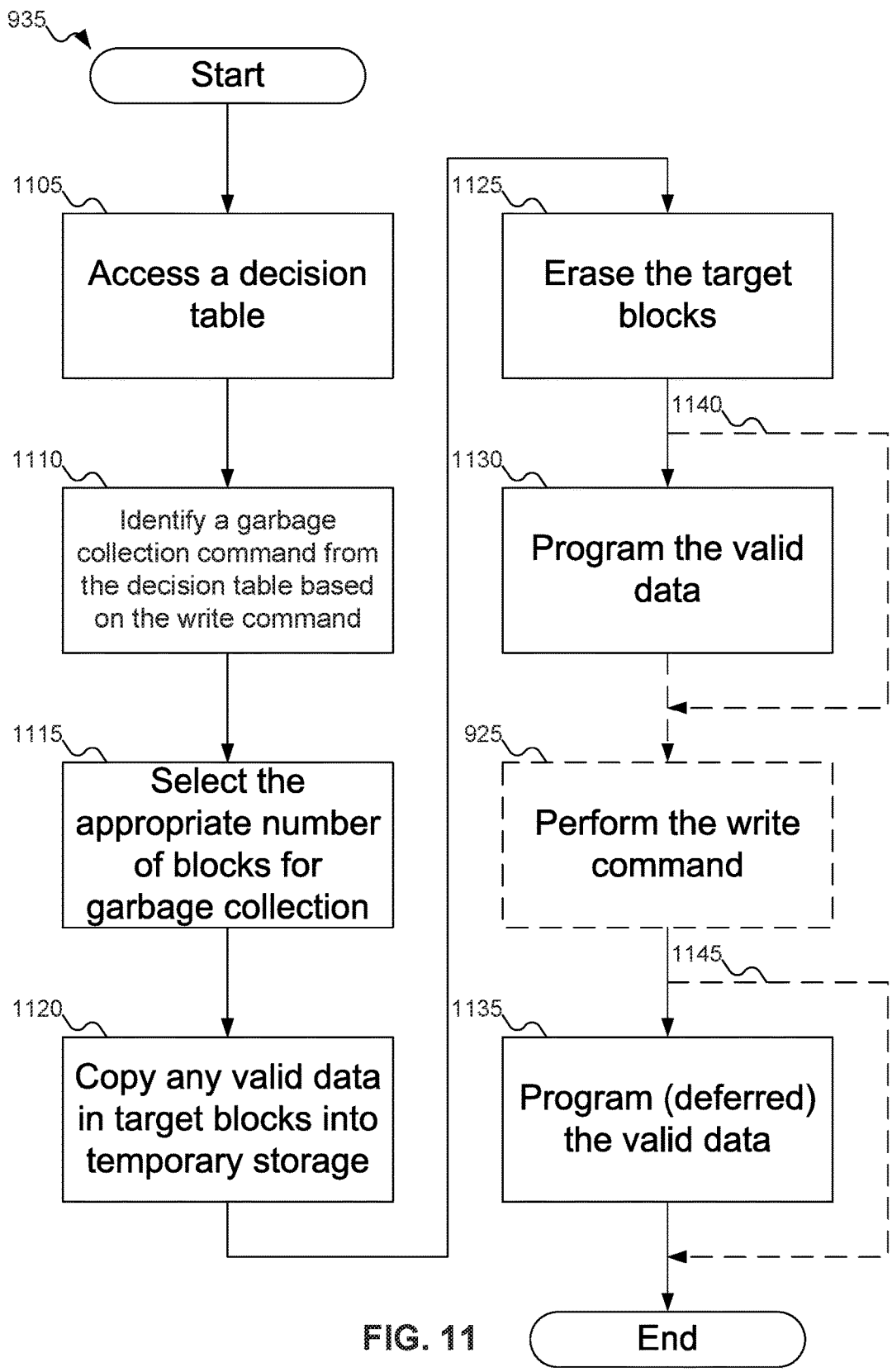
FIG. 11 shows a flowchart of an example procedure for using the tail latency-aware garbage collection strategy of FIG. 5, according to an embodiment of the inventive concept.

FIG. 11 shows a flowchart of an example procedure for using tail latency-aware garbage collection strategy 510 of FIG. 5, according to an embodiment of the inventive concept. In FIG. 11, at block 1105, flash translation layer 325 of FIG. 3 may access decision table 335 of FIG. 3. At block 1110, based on the received write command's size 355-1 through 355-3 of FIG. 3, flash translation layer 325 of FIG. 3 may determine the appropriate garbage collection command size 360-1 through 360-3 of FIG. 3 to perform from decision table 335 of FIG. 3. At block 1115, flash translation layer 325 of FIG. 3 may select the appropriate number of blocks for garbage collection, as determined from decision table 335 of FIG. 3. At block 1120, flash translation layer 325 of FIG. 3 may copy any valid data in the blocks to be erased into temporary storage (e.g., into DRAM within SSD controller 310 of FIG. 3). At block 1125, the target blocks may be erased. At block 1130, the valid data that was in the target blocks may be programmed into other free pages in SSD 120 of FIG. 1, after which at block 925 SSD 120 of FIG. 1 may perform the received write command (shown with dashed lines since block 925 is not technically part of performing just-in-time garbage collection).

In some embodiments of the inventive concept, rather than programming the valid data before performing the write command, the programming operation may be deferred. For example, U.S. patent application Ser. No. 15/133,205, filed Apr. 19, 2016, which claims the benefit of U.S. Provisional Patent Application Ser. No. 62/286,926, filed Jan. 25, 2016, both of which are incorporated by reference herein for all purposes, describes how dynamic garbage collection Program/Erase policies may be used, which may include deferring programming operations to improve performance of SSD 120 of FIG. 1. In such embodiments of the inventive concept, programming the valid data would occur not at block 1130 but rather at block 1135. Dashed lines 1140 and 1145 may indicate which of blocks 1130 and 1135 to perform and which to skip, based on the embodiment of the inventive concept that has been implemented.

Figure 12:
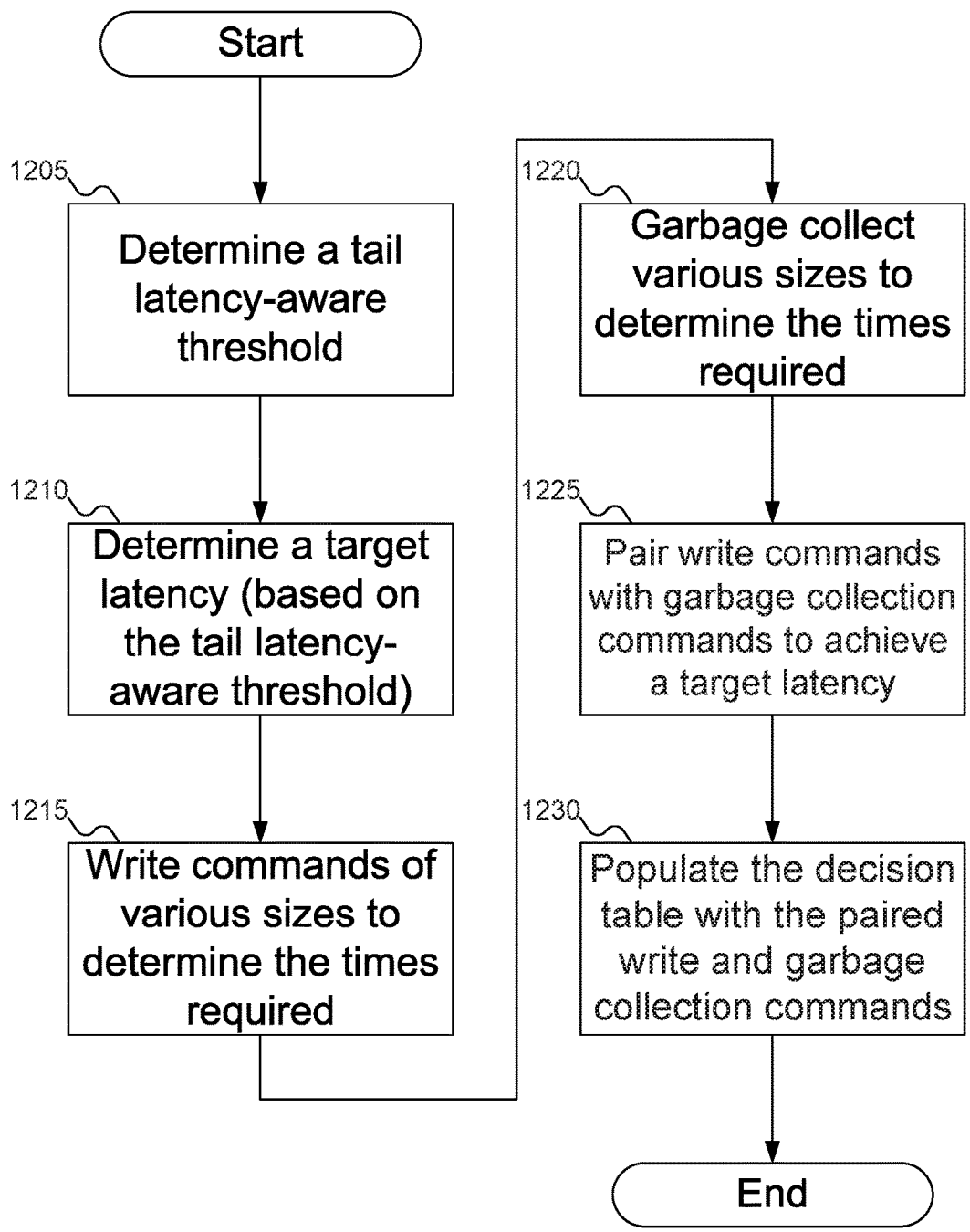
FIG. 12 shows a flowchart of an example procedure for the flash translation layer of FIG. 3 to populate the decision table of FIG. 5, according to an embodiment of the inventive concept.

FIG. 12 shows a flowchart of an example procedure for flash translation layer 325 of FIG. 3 to populate decision table 335 of FIG. 3, according to an embodiment of the inventive concept. In FIG. 12, at block 1205, flash translation layer 325 of FIG. 3 may determine tail latency-aware threshold 345 of FIG. 3. At block 1210, flash translation layer 325 of FIG. 3 may determine target latency 805 of FIG. 8, which may be based on tail latency-aware threshold 345 of FIG. 3 (as described above, target latency 805 may depend on information other than just tail latency-aware threshold 345 of FIG. 3). At block 1215, flash translation layer 325 of FIG. 3 may perform or observe write commands of various sizes to determine the times required to perform those write commands. At block 1220, flash translation layer 325 of FIG. 3 may perform garbage collection commands on various numbers of blocks to determine the time required to perform those garbage collection commands. (Note that not every possible number of blocks needs to be tested: once a large enough number of blocks has been tested that requires a time that exceeds target latency 805 of FIG. 8, no garbage collection command involving a larger number of blocks needs to be timed, as the total time for both a write command and any larger garbage collection command would exceed target latency 805 of FIG. 8.) At block 1225, flash translation layer 325 of FIG. 3 may pair write commands with garbage collection commands so that the time required to perform each pair is approximately target latency 805 of FIG. 8. Finally, at block 1230, flash translation layer 325 of FIG. 3 may populate decision table 335 of FIG. 3 with the pairs established in block 1225.

Figure 8:
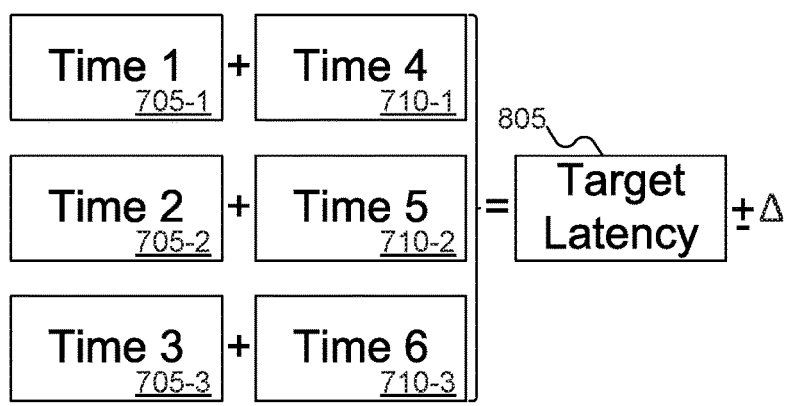
FIG. 8 shows pairs of write commands and garbage collection commands that approximately require a target latency, for use in the decision table of FIG. 5.
Figure 13:
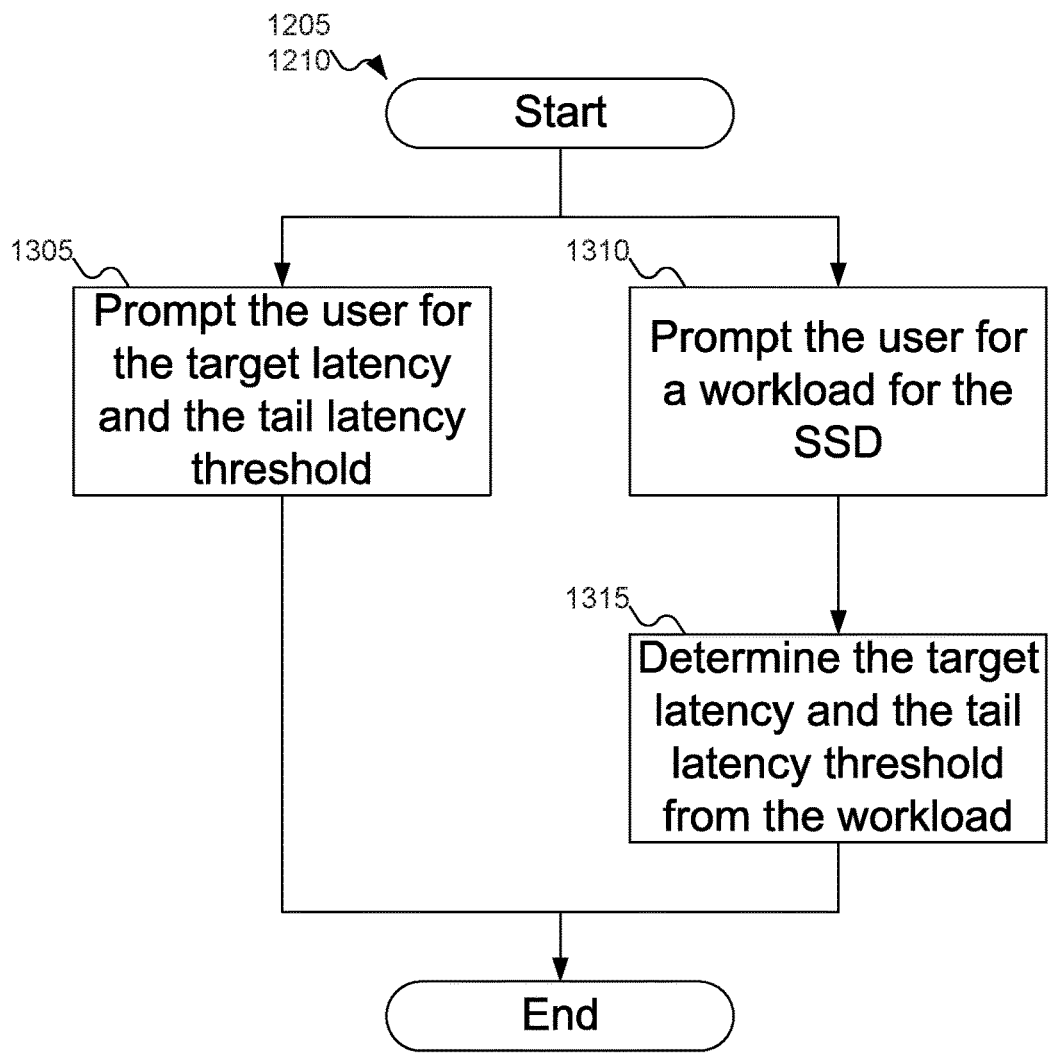
FIG. 13 shows a flowchart of an example for determining the tail latency-aware threshold of FIG. 5 and the target latency of FIG. 8, according to an embodiment of the inventive concept.

FIG. 13 shows a flowchart of an example for determining tail latency-aware threshold 345 of FIG. 3 and target latency 805 of FIG. 8, according to an embodiment of the inventive concept. In FIG. 13, at block 1305, SSD 120 of FIG. 1 may prompt the user to provide tail latency-aware threshold 345 of FIG. 3 and target latency 805 of FIG. 8. Alternatively, at block 1310, SSD 120 of FIG. 1 may prompt an administrative user of machine 105 for the expected workload of SSD 120 of FIG. 1, after which, at block 1315, flash translation layer 325 of FIG. 3 may determine appropriate initial values for tail latency-aware threshold 345 of FIG. 3 and target latency 805 of FIG. 8.

While FIG. 13 describes SSD 120 of FIG. 1 prompting the administrative user for the expected workload for SSD 120 of FIG. 1, other embodiments of the inventive concept may have this information arrive in other ways. For example, the customer, when ordering SSD 120 of FIG. 1, may inform the vendor of the expected workload for SSD 120 of FIG. 1, and the vendor may prepare SSD 120 of FIG. 1 for that particular workload, either by pre-programming values for target latency 805 of FIG. 8 and tail latency-aware threshold 345 of FIG. 3, or by preparing a script that may program SSD 120 of FIG. 1 accordingly.

In FIGS. 9A-13, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:

a host interface logic to receive a write command from a host at an SSD;

flash memory to store data; and an SSD controller to manage reading and writing data to the flash memory, the SSD controller including storage for a just-in-time threshold and a tail latency threshold and a flash translation layer comprising:

a just-in-time garbage collection strategy invoked when a number of free pages is less than the just-in-time threshold; and a tail latency-aware garbage collection strategy invoked when the number of free pages is less than the tail latency threshold, wherein the tail latency threshold is greater than the just-in-time threshold, and wherein the tail latency-aware garbage collection strategy pairs the write command with a garbage collection command.

Statement 2. An embodiment of the inventive concept includes an SSD according to statement 1, wherein the just-in-time garbage collection strategy may perform garbage collection on enough blocks to increase the number of free pages on the SSD to a sufficient number to satisfy the write command.

Statement 3. An embodiment of the inventive concept includes an SSD according to statement 1, wherein the tail latency-aware garbage collection strategy may perform both the write command and the garbage collection command, where a time required to perform both the write command and the garbage collection command is approximately a target latency.

Statement 4. An embodiment of the inventive concept includes an SSD according to statement 3, wherein the flash translation layer further includes a decision table, the decision table including a plurality of pairs, each of the plurality of pairs including a plurality of write command information and a plurality of garbage collection command information, wherein a second time required to perform each pair in the plurality of pairs is approximately the target latency.

Statement 5. An embodiment of the inventive concept includes an SSD according to statement 4, wherein:

the write command information is drawn from a set including a write command size and number of write commands; and the garbage collection command information is drawn from a set including a garbage collection command size and number of garbage collection commands.

Statement 6. An embodiment of the inventive concept includes an SSD according to statement 4, wherein the tail latency-aware garbage collection strategy may access the garbage collection command information from the decision table responsive to the write command information.

Statement 7. An embodiment of the inventive concept includes an SSD according to statement 4, wherein the target latency is user-configurable.

Statement 8. An embodiment of the inventive concept includes an SSD according to statement 4, wherein the plurality of garbage collection commands information are selected so that the second time required to perform each pair in the plurality of pairs is approximately the target latency.

Statement 9. An embodiment of the inventive concept includes an SSD according to statement 4, wherein the plurality of garbage collection commands information are selected responsive to the tail latency threshold.

Statement 10. An embodiment of the inventive concept includes an SSD according to statement 4, wherein:

the flash translation layer further includes a timer to determine a plurality of first times required to write each of a plurality of write command information and a plurality of second times required to garbage collect each of a plurality of garbage collection information; and the decision table may be populated with the plurality of pairs of write command information and garbage collection command information responsive to the plurality of first times and the plurality of second times.

Statement 11. An embodiment of the inventive concept includes an SSD according to statement 10, wherein the decision table may be populated with the plurality pairs of write command information and garbage collection command information responsive to the plurality of first times and the plurality of second times and at least one of a target latency and the tail latency threshold.

Statement 12. An embodiment of the inventive concept includes an SSD according to statement 1, wherein the tail latency threshold is user-configurable.

Statement 13. An embodiment of the inventive concept includes an SSD according to statement 1, wherein the tail latency threshold is set responsive to a workload to be imposed on the SSD.

Statement 14. An embodiment of the inventive concept includes an SSD according to statement 1, wherein the tail latency-aware garbage collection strategy may be invoked even though the number of free pages on the SSD is large enough to complete the write command.

Statement 15. An embodiment of the inventive concept includes an SSD according to statement 1, wherein a program operation of the garbage collection command may be deferred until after completing the write command.

Statement 16. An embodiment of the inventive concept includes a method, comprising:

receiving a write command at a Solid State Drive (SSD);

determining a number of free pages on the SSD;

if the number of free pages on the SSD is less than a just-in-time threshold, performing garbage collection using a just-in-time garbage collection strategy;

if the number of free pages on the SSD is less than a tail latency threshold, performing garbage collection using a tail latency-aware garbage collection strategy;

if the number of free pages on the SSD is greater than or equal to the tail latency threshold, performing no garbage collection; and performing the write command on the SSD, wherein the tail latency threshold is greater than the just-in-time threshold, and wherein the tail latency-aware garbage collection strategy pairs the write command with a garbage collection command.

Statement 17. An embodiment of the inventive concept includes a method according to statement 16, wherein performing garbage collection using a just-in-time garbage collection strategy includes performing garbage collection on enough blocks to increase the number of free pages on the SSD to a sufficient number to satisfy the write command.

Statement 18. An embodiment of the inventive concept includes a method according to statement 16, wherein performing garbage collection using a tail latency-aware garbage collection strategy includes performing both the write command and the garbage collection command, where a time required to perform both the write command and the garbage collection command is approximately a target latency.

Statement 19. An embodiment of the inventive concept includes a method according to statement 18, wherein performing garbage collection using a tail latency-aware garbage collection strategy further includes accessing the paired the garbage collection command from a decision table responsive to the write command.

Statement 20. An embodiment of the inventive concept includes a method according to statement 19, wherein the decision table includes a plurality of pairs, each of the plurality of pairs including a plurality of write commands information and a plurality of garbage collection commands information, wherein a second time required to perform each pair in the plurality of pairs is approximately the target latency.

Statement 21. An embodiment of the inventive concept includes a method according to statement 20, wherein:

the write command information is drawn from a set including a write command size and number of write commands; and the garbage collection command information is drawn from a set including a garbage collection command size and number of garbage collection commands.

Statement 22. An embodiment of the inventive concept includes a method according to statement 20, further comprising populating the decision table with the plurality of pairs of write command information and garbage collection command information responsive to a plurality of first times and a plurality of second times.

Statement 23. An embodiment of the inventive concept includes a method according to statement 22, further comprising:

writing a plurality of write command sizes to determine the plurality of first times required to perform each of the plurality of write command sizes; and garbage collecting a plurality of garbage collection command sizes to determine the plurality of second times required to perform each of the plurality of garbage collection command sizes.

Statement 24. An embodiment of the inventive concept includes a method according to statement 22, further comprising:

writing a plurality of numbers of write commands to determine the plurality of first times required to perform each of the plurality of numbers of write commands; and garbage collecting a plurality of numbers of garbage collection commands to determine the plurality of second times required to perform each of the plurality of numbers of garbage collection commands.

Statement 25. An embodiment of the inventive concept includes a method according to statement 22, wherein populating a decision table with the plurality of pairs of write command information and garbage collection command information responsive to a plurality of first times and a plurality of second times includes populating a decision table with the plurality of pairs of write command information and garbage collection command information responsive to the plurality of first times and the plurality of second times and at least one of a target latency and the tail latency threshold.

Statement 26. An embodiment of the inventive concept includes a method according to statement 25, further comprising determining the target latency and the tail latency threshold.

Statement 27. An embodiment of the inventive concept includes a method according to statement 26, wherein determining a target latency and the tail latency threshold includes prompting a user for the target latency and the tail latency threshold.

Statement 28. An embodiment of the inventive concept includes a method according to statement 26, wherein determining a target latency and the tail latency threshold includes:

prompting a user for a workload for the SSD; and determining the target latency and tail latency threshold responsive to the workload for the SSD.

Statement 29. An embodiment of the inventive concept includes a method according to statement 22, wherein populating the decision table with the plurality of pairs of write command information and garbage collection command information responsive to a plurality of first times and a plurality of second times includes populating the decision table with the plurality of pairs of write command information and garbage collection command information responsive to a plurality of first times and a plurality of second times at a startup of the SSD.

Statement 30. An embodiment of the inventive concept includes a method according to statement 18, wherein performing both the write command and the garbage collection command includes deferring a program operation of the garbage collection command until after completing the write command.

Statement 31. An embodiment of the inventive concept includes a method according to statement 16, wherein performing garbage collection using a tail latency-aware garbage collection strategy includes performing garbage collection using the tail latency-aware garbage collection strategy even though the number of free pages is large enough to complete the write command.

Statement 32. An embodiment of the inventive concept includes an article comprising a tangible storage medium, the tangible storage medium having stored thereon non-transitory instructions that, when executed by a machine, result in:

receiving a write command at a Solid State Drive (SSD);

determining a number of free pages on the SSD;

if the number of free pages on the SSD is less than a just-in-time threshold, performing garbage collection using a just-in-time garbage collection strategy;

if the number of free pages on the SSD is less than a tail latency threshold, performing garbage collection using a tail latency-aware garbage collection strategy;

if the number of free pages on the SSD is greater than or equal to the tail latency threshold, performing no garbage collection; and performing the write command on the SSD, wherein the tail latency threshold is greater than the just-in-time threshold, and wherein the tail latency-aware garbage collection strategy pairs the write command with a garbage collection command.

Statement 33. An embodiment of the inventive concept includes an article according to statement 32, wherein performing garbage collection using a just-in-time garbage collection strategy includes performing garbage collection on enough blocks to increase the number of free pages on the SSD to a sufficient number to satisfy the write command.

Statement 34. An embodiment of the inventive concept includes an article according to statement 32, wherein performing garbage collection using a tail latency-aware garbage collection strategy includes performing both the write command and the garbage collection command, where a time required to perform both the write command and the garbage collection command is approximately a target latency.

Statement 35. An embodiment of the inventive concept includes an article according to statement 34, wherein performing garbage collection using a tail latency-aware garbage collection strategy further includes accessing the paired the garbage collection command from a decision table responsive to the write command.

Statement 36. An embodiment of the inventive concept includes an article according to statement 35, wherein the decision table includes a plurality of pairs, each of the plurality of pairs including a plurality of write command sizes and a plurality of garbage collection command sizes, wherein a second time required to perform each pair in the plurality of pairs is approximately the target latency.

Statement 37. An embodiment of the inventive concept includes an article according to statement 36, wherein:

the write command information is drawn from a set including a write command size and number of write commands; and the garbage collection command information is drawn from a set including a garbage collection command size and number of garbage collection commands.

Statement 38. An embodiment of the inventive concept includes an article according to statement 36, the tangible storage medium having stored thereon further non-transitory instructions that, when executed by the machine, result in populating the decision table with the plurality of pairs of write command information and garbage collection command information responsive to a plurality of first times and a plurality of second times.

Statement 39. An embodiment of the inventive concept includes an article according to statement 38, the tangible storage medium having stored thereon further non-transitory instructions that, when executed by the machine, result in:

writing a plurality of write command sizes to determine the plurality of first times required to perform each of the plurality of write command sizes; and garbage collecting a plurality of garbage collection command sizes to determine the plurality of second times required to perform each of the plurality of garbage collection command sizes.

Statement 40. An embodiment of the inventive concept includes an article according to statement 38, the tangible storage medium having stored thereon further non-transitory instructions that, when executed by the machine, result in:

writing a plurality of numbers of write commands to determine the plurality of first times required to perform each of the plurality of numbers of write commands; and garbage collecting a plurality of numbers of garbage collection commands to determine the plurality of second times required to perform each of the plurality of numbers of garbage collection commands.

Statement 41. An embodiment of the inventive concept includes an article according to statement 38, wherein populating a decision table with the plurality of pairs of write command information and garbage collection command information responsive to a plurality of first times and a plurality of second times includes populating the decision table with the plurality of pairs of write command information and garbage collection command information responsive to the plurality of first times and the plurality of second times and at least one of a target latency and the tail latency threshold.

Statement 42. An embodiment of the inventive concept includes an article according to statement 41, the tangible storage medium having stored thereon further non-transitory instructions that, when executed by the machine, result in determining the target latency and the tail latency threshold.

Statement 43. An embodiment of the inventive concept includes an article according to statement 42, wherein determining a target latency and the tail latency threshold includes prompting a user for the target latency and the tail latency threshold.

Statement 44. An embodiment of the inventive concept includes an article according to statement 42, wherein determining a target latency and the tail latency threshold includes:

prompting a user for a workload for the SSD; and determining the target latency and tail latency threshold responsive to the workload for the SSD.

Statement 45. An embodiment of the inventive concept includes an article according to statement 38, wherein populating the decision table with the plurality of pairs of write command information and garbage collection command information responsive to a plurality of first times and a plurality of second times includes populating the decision table with the plurality of pairs of write command information and garbage collection command information responsive to a plurality of first times and a plurality of second times at a startup of the SSD.

Statement 46. An embodiment of the inventive concept includes an article according to statement 34, wherein performing both the write command and the garbage collection command includes deferring a program operation of the garbage collection command until after completing the write command.

Statement 47. An embodiment of the inventive concept includes an article according to statement 32, wherein performing garbage collection using a tail latency-aware garbage collection strategy includes performing garbage collection using the tail latency-aware garbage collection strategy even though the number of free pages is large enough to complete the write command.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Solid State Drive (SSD), comprising:
a host interface logic to receive a write command from a host at an SSD;
flash memory to store data; and
an SSD controller to manage reading and writing data to the flash memory, the SSD controller including storage for a just-in-time threshold and a tail latency threshold and a flash translation layer comprising:
a just-in-time garbage collection strategy invoked when a number of free pages is less than the just-in-time threshold; and
a tail latency-aware garbage collection strategy invoked when the number of free pages is less than the tail latency threshold,
wherein the tail latency threshold is greater than the just-in-time threshold,
wherein the tail latency-aware garbage collection strategy pairs the write command with a garbage collection command, and the garbage collection command and the write command are both executed on the SSD as part of responding to the write command,
wherein the tail latency-aware garbage collection strategy may perform both the write command and the garbage collection command, where a time required to perform both the write command and the garbage collection command is no greater than a target latency plus a delta, and
wherein the tail latency-aware garbage collection strategy may be invoked even though the number of free pages on the SSD is large enough to complete the write command.

2. The SSD according to claim 1, wherein the flash translation layer further includes a decision table, the decision table including a plurality of pairs, each of the plurality of pairs including a plurality of write command information and a plurality of garbage collection command information, wherein each of a plurality of times required to perform each pair in the plurality of pairs is approximately the target latency.

3. The SSD according to claim 2, wherein:
the write command information is drawn from a set including a write command size and number of write commands; and
the garbage collection command information is drawn from a set including a garbage collection command size and number of garbage collection commands.

4. The SSD according to claim 2, wherein the plurality of garbage collection commands information are selected so that each of a plurality of times required to perform each pair in the plurality of pairs is approximately the target latency.

5. The SSD according to claim 2, wherein:
the flash translation layer further includes a timer to determine a plurality of first times required to write each of a plurality of write command information and a plurality of second times required to garbage collect each of a plurality of garbage collection information; and
the decision table may be populated with the plurality of pairs of write command information and garbage collection command information responsive to the plurality of first times and the plurality of second times.

6. The SSD according to claim 5, wherein the decision table may be populated with the plurality pairs of write command information and garbage collection command information responsive to the plurality of first times and the plurality of second times and at least one of a target latency and the tail latency threshold.

7. A method, comprising:
receiving a write command at a Solid State Drive (SSD);
determining a number of free pages on the SSD;

based at least in part on the number of free pages on the SSD and a just-in-time threshold, performing garbage collection using a just-in-time garbage collection strategy;

based at least in part on the number of free pages on the SSD and a tail latency threshold, performing garbage collection using a tail latency-aware garbage collection strategy;

based at least in part on the number of free pages on the SSD and the tail latency threshold, performing no garbage collection; and performing the write command on the SSD, wherein the tail latency threshold is greater than the just-in-time threshold, wherein the tail latency-aware garbage collection strategy pairs the write command with a garbage collection command, a time required to perform both the write command and the garbage collection command is no greater than a target latency plus a delta, and wherein the tail latency-aware garbage collection strategy may be invoked even though the number of free pages on the SSD is large enough to complete the write command.

8. A method according to claim 7, wherein performing garbage collection using a tail latency-aware garbage collection strategy further includes accessing the paired the garbage collection command from a decision table responsive to the write command.

9. A method according to claim 8, wherein the decision table includes a plurality of pairs, each of the plurality of pairs including a plurality of write commands information and a plurality of garbage collection commands information, wherein a second time required to perform each pair in the plurality of pairs is approximately the target latency.

10. A method according to claim 9, wherein:
the write command information is drawn from a set including a write command size and number of write commands; and
the garbage collection command information is drawn from a set including a garbage collection command size and number of garbage collection commands.

11. A method according to claim 9, further comprising populating the decision table with the plurality of pairs of write command information and garbage collection command information responsive to a plurality of first times and a plurality of second times.

12. A method according to claim 11, further comprising:
writing a plurality of write command sizes to determine the plurality of first times required to perform each of the plurality of write command sizes; and
garbage collecting a plurality of garbage collection command sizes to determine the plurality of second times required to perform each of the plurality of garbage collection command sizes.

13. A method according to claim 11, further comprising:
writing a plurality of numbers of write commands to determine the plurality of first times required to perform each of the plurality of numbers of write commands; and
garbage collecting a plurality of numbers of garbage collection commands to determine the plurality of second times required to perform each of the plurality of numbers of garbage collection commands.

14. A method according to claim 11, wherein populating a decision table with the plurality of pairs of write command information and garbage collection command information responsive to a plurality of first times and a plurality of second times includes populating a decision table with the plurality of pairs of write command information and garbage collection command information responsive to the plurality of first times and the plurality of second times and at least one of a target latency and the tail latency threshold.

15. An article comprising a tangible storage medium, the tangible storage medium having stored thereon non-transitory instructions that, when executed by a machine, result in:
receiving a write command at a Solid State Drive (SSD);
determining a number of free pages on the SSD;
based at least in part on the number of free pages on the SSD and a just-in-time threshold, performing garbage collection using a just-in-time garbage collection strategy;
based at least in part on the number of free pages on the SSD and a tail latency threshold, performing garbage collection using a tail latency-aware garbage collection strategy;
based at least in part on the number of free pages on the SSD and the tail latency threshold, performing no garbage collection; and
performing the write command on the SSD,
wherein the tail latency threshold is greater than the just-in-time threshold, and
wherein the tail latency-aware garbage collection strategy pairs the write command with a garbage collection command, a time required to perform both the write command and the garbage collection command is no greater than a target latency plus a delta, and
wherein the tail latency-aware garbage collection strategy may be invoked even though the number of free pages on the SSD is large enough to complete the write command.

16. A method according to claim 7, wherein:
performing garbage collection using a just-in-time garbage collection strategy includes performing garbage collection on the SSD using the just-in-time garbage collection strategy;
performing garbage collection using a tail latency-aware garbage collection strategy includes performing garbage collection on the SSD using the tail latency-aware garbage collection strategy; and
performing no garbage collection includes performing no garbage collection on the SSD.

17. An article according to claim 15, wherein:
performing garbage collection using a just-in-time garbage collection strategy includes performing garbage collection on the SSD using the just-in-time garbage collection strategy;
performing garbage collection using a tail latency-aware garbage collection strategy includes performing garbage collection on the SSD using the tail latency-aware garbage collection strategy; and
performing no garbage collection includes performing no garbage collection on the SSD.

* * * * *